United States Patent [19]
Festos

[11] 3,743,922
[45] July 3, 1973

[54] PORTABLE AUTOMOTIVE SPARK VOLTAGE TESTER

[76] Inventor: Nicholas G. Festos, 2750 North Clark St., Chicago, Ill. 60614

[22] Filed: June 7, 1971

[21] Appl. No.: 150,365

Related U.S. Application Data

[63] Continuation-in-part of Ser. No. 801,328, Feb. 24, 1969, abandoned.

[52] U.S. Cl. .................. 324/19, 324/16 R, 324/119
[51] Int. Cl. ...................... G01r 29/00, G01r 19/22
[58] Field of Search .................... 324/19, 16 R, 17, 324/119, 15, 18

[56] References Cited
UNITED STATES PATENTS 3,028,543  4/1962  Parmater et al. .................. 324/16
2,924,790  2/1960  Payne .................. 324/119
3,369,175  2/1968  Morris .................. 324/17

OTHER PUBLICATIONS

Taylor, D. P.; Transmitter Measurements; The Wireless World; June 1, 1939; pg. 513–514

Primary Examiner—Rudolph V. Rolinec
Assistant Examiner—Ernest F. Karlsen
Attorney—Edward C. Threedy

[57] ABSTRACT

A circuit for testing spark voltages in internal combustion engines or similar devices wherein the circuit capacitively samples the voltage of an in situ spark plug of an internal combustion engine by shunt-rectifying, filtering, and applying it to a direct current meter for visual indication.

1 Claim, 2 Drawing Figures

Patented July 3, 1973

3,743,922

INVENTOR:
NICHOLAS G. FESTOS
BY Edward C. Threedy
HIS ATTORNEY.

PORTABLE AUTOMOTIVE SPARK VOLTAGE TESTER

This application is a continuation-in-part of my copending application, Ser. No. 801,328, filed Feb. 24, 1969 now abandoned, on a Spark Voltage Tester.

SUMMARY OF THE INVENTION

A circuit for determining the voltage between the electrodes of an in situ spark plug during the spark process, which circuit by a novel arrangement of components shunts, rectifies, and filters the pulsating current into a direct current meter for visual intensity indication without shorting out the electrodes. The desired components of the circuit give a high sensitivity to the meter and the direct current flowing therethrough so that the intensity of the spark may be measured in micro amps. The circuit may be readily adapted to measure the magneto output as well as the functioning of a coil.

GENERAL DESCRIPTION

Figure 1:
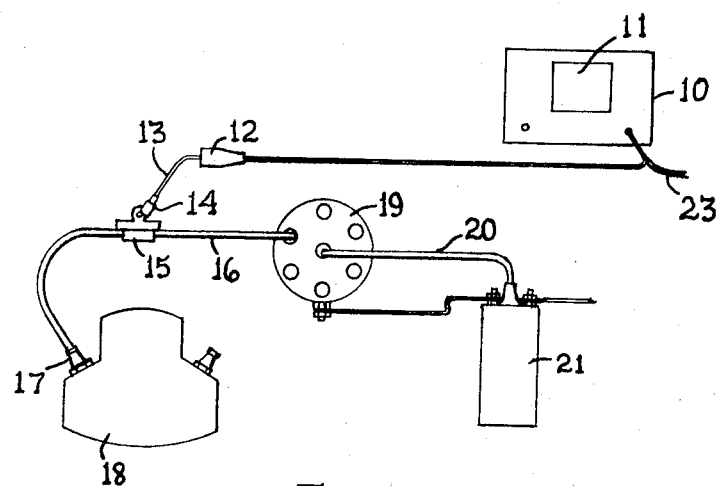
Figure 2:
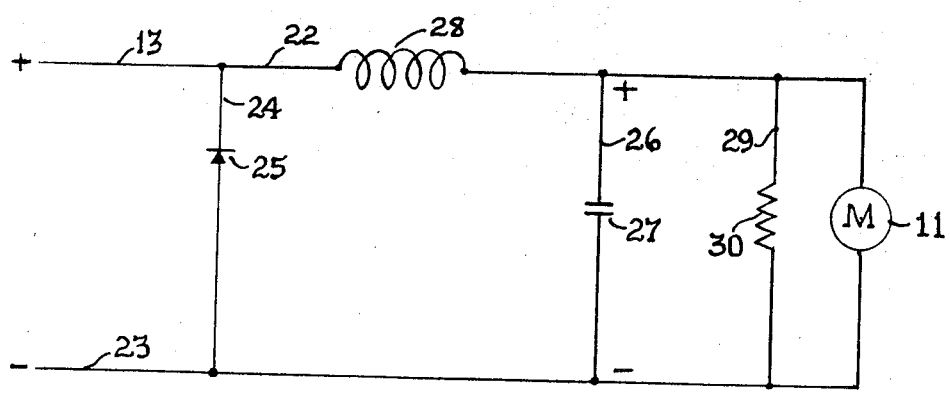

The invention will be best understood by reference to the accompanying drawing, which shows:

FIG. 1 is a schematic view of the testing device in operative association with parts to be tested; and FIG. 2 is a schematic circuitry of the invention.

The circuit of this invention will test the intensity of the spark of a spark plug while the latter remains installed in and is operable with an internal combustion engine. The high frequency alternating current generated by the firing of the spark will be converted by the circuit of this invention into direct current and then by means of a direct current electric meter visually indicate the intensity of the spark as it occurs between the electrodes of the plug.

The apparatus consists of a portable circuit housing 10 including a direct current meter 11 having a scale of 0 to 24 KV and a probe 12. Leading from the probe 12 is a positive lead pickup 13 which includes a connector 14 that can be attached to a capacitive pickup clamp 15 connected to the lead 16 of the spark plug 17 to be tested.

As shown in FIG. 1, the spark plug 17 remains in operative position with respect to the internal combustion engine 18 and, as such, is tested in situ and under normal operating conditions without shorting of its electrodes. The spark plug lead 16 is in turn connected to a distributor 19, in turn connected by lead 20 to a coil 21, all of which are standard equipment for internal combustion engines.

The circuit consists of the pickup lead 13 and a positive lead 22 and negative or ground 23.

By a lead line 24, a diode 25 is connected across the pickup lead 13 and the negative lead 23.

By a lead line 26, a by-pass condenser 27 is connected across the positive lead 22 and the negative lead 23 in parallel to the diode 25.

In the positive lead 22 between lead lines 24 and 26 is a choke 28.

Extending across the positive lead 22 and the negative lead 23 and parallel to the diode 25 and condenser 27 and in lead line 29, is a resistor 30. Connected in parallel to the resistor 30 is the direct current meter 11.

It should be noted that the diode 25 and choke 28 are contained in the probe 12 so as to be between the pickup lead 13 and the positive lead 22.

The alternating current of the spark plug is rectified into a positive direct current by means of the shunt diode 25, and further conditioned by the choke 28 and the by-pass condenser 27. The current will be relatively high voltage so that the resistor 30 will further shunt the same across the meter 11, thus reducing the voltage to a safe value where it will operate but not damage the direct current meter 11. In this regard, when this circuitry is to be employed in other equipment the resistor 30 may be variable so as to compensate for the desired voltage to be supplied across the meter.

The circuit will determine the voltage between the electrodes of the spark plug during its sparking process. Electrodes with too wide a gap therebetween or that contain lead oxide or carbon deposits will show relatively high voltage readings on the meter 11, while electrodes having too small a gap will show low voltage readings on the meter 11.

The importance of the component arrangement of this circuit allows the optimum number of electrons to flow therethrough, giving a true reading on the meter 11 of the intensity of the spark voltage.

It is readily apparent that each spark plug of an internal combustion engine can be readily tested while in position and operatively connected to the internal combustion engine. The circuit is readily applicable to the testing of a coil or magneto output, and, as such, may be conveniently utilized to test equipment employing these parts as components thereof.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the appended claims.

Having thus described my invention, what I claim as new and desire to protect by Letters Patent is:

1. A portable internal combustion engine spark plug testing apparatus for visually indicating the intensity of the spark of a discharging spark plug in an internal combustion engine while the spark is firing during the continuing operation of the engine, comprising:

a. a circuit having a positive lead provided with means for connection to an engine mounted and operating spark plug lead to be tested and a negative lead provided with means for connection to ground, b. a direct current meter in said circuit for visually indicating the voltage of the spark of said plug as it is being fired during operation of the engine, c. a diode having a cathode circuit and an anode circuit connected respectively to said positive and negative leads for rectifying the current from the spark plug from alternating to direct, d. a filter connected in the positive lead of said circuit between said diode and said direct current meter and including a choke in said positive lead and a by-pass condenser connected in shunt with said direct current meter for filtering the direct current to the direct current meter, e. a resistor for controlling the voltage of the rectified current as it passes through said meter so the same will have a high degree of sensitivity for an accurate reading of the intensity of the voltage of the plug being tested, f. including a capacitive pickup clip for mounting in the spark plug lead, and
g. wherein said means provided by said positive lead for connection to the engine mounted and operating spark plug lead comprises a probe housing the diode and the choke of the circuit, said means provided including a connector adapted to be attached to the capacitive pickup clip mounted upon the spark plug lead of the spark plug to be tested.

* * * * *